United States Patent
Park et al.

(10) Patent No.: US 12,537,962 B2
(45) Date of Patent: Jan. 27, 2026

(54) VIDEO ENCODING/DECODING METHOD AND APPARATUS

(71) Applicants: HYUNDAI MOTOR COMPANY, Seoul (KR); KIA CORPORATION, Seoul (KR)

(72) Inventors: Seung Wook Park, Yongin-si (KR); Jin Heo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 38 days.

(21) Appl. No.: 18/399,310

(22) Filed: Dec. 28, 2023

(65) Prior Publication Data

US 2024/0137528 A1    Apr. 25, 2024

Related U.S. Application Data

(63) Continuation of application No. PCT/KR2022/009403, filed on Jun. 30, 2022.

(30) Foreign Application Priority Data

Jul. 2, 2021 (KR) .......... 10-2021-0086881
Jun. 28, 2022 (KR) .......... 10-2022-0079202

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
CPC .... H04N 19/159; H04N 19/105; H04N 19/11; H04N 19/147; H04N 19/176;
(Continued)

(56) References Cited

U.S. PATENT DOCUMENTS 8,228,989 B2   7/2012  Kim et al.
11,051,027 B2  6/2021  Wang et al.
(Continued)

FOREIGN PATENT DOCUMENTS

KR   101365575 B1    2/2014
KR   20210057187 A   5/2021
WO   WO-2021130025 A1 *  7/2021  .......... H04N 19/105

OTHER PUBLICATIONS

Chen J., et al., "Algorithm Description for Versatile Video Coding and Test Model 5 (VTM 5)", 126th MPEG Meeting, Mar. 19, 2019-Mar. 27, 2019, Geneva, (Motion Picture Expert Group or ISO/IEC JTC1/SC29/WG11), No. m48054, (JVET) of ITU-T SG 16 WP 3 and ISO/IEC JTC 1/SC 29/WG11, Jun. 2019 (Year: 2019).*

(Continued)

*Primary Examiner* — Dramos Kalapodas
(74) *Attorney, Agent, or Firm* — Lempia Summerfield Katz LLC

(57) ABSTRACT

A method and a device for encoding/decoding a video are provided. A method for decoding a video according to the present disclosure includes generating an inter prediction block for a current block, based on a reference block that corresponds to the current block and exists in a reference picture. The method for decoding the video also includes generating an intra prediction block for the current block, based on the reference block and a first reference pixel adjacent to the reference block. The method for decoding the video also includes deriving weighted values assigned to the inter prediction block and the intra prediction block, based on not using the current block for distortion calculation. The (Continued)

method for decoding the video also includes generating a combined inter/intra prediction (CIIP) block of the current block, based on the weight values, the inter prediction block, and the intra prediction block.

9 Claims, 26 Drawing Sheets

(51) Int. Cl.
    *H04N 19/11*     (2014.01)
    *H04N 19/147*     (2014.01)
    *H04N 19/176*     (2014.01)
    *H04N 19/503*     (2014.01)
    *H04N 19/593*     (2014.01)

(52) U.S. Cl.
    CPC ......... *H04N 19/147* (2014.11); *H04N 19/176* (2014.11); *H04N 19/503* (2014.11); *H04N 19/593* (2014.11)

(58) Field of Classification Search
    CPC .. H04N 19/503; H04N 19/593; H04N 19/107; H04N 19/513; H04N 19/51
    See application file for complete search history.

(56) References Cited

U.S. PATENT DOCUMENTS

| | | | |
|---|---|---|---|
| 11,336,900 B2 * | 5/2022 | Huang | H04N 19/593 |
| 11,438,630 B2 * | 9/2022 | Jang | H04N 19/70 |
| 11,601,641 B2 | 3/2023 | Ko et al. | |
| 2008/0187044 A1 | 8/2008 | Kim et al. | |
| 2020/0314432 A1 | 10/2020 | Wang et al. | |
| 2020/0413071 A1 | 12/2020 | Huang et al. | |
| 2021/0006803 A1 * | 1/2021 | Zhang | H04N 19/583 |
| 2021/0160528 A1 * | 5/2021 | Chen | H04N 19/184 |
| 2021/0235072 A1 | 7/2021 | Ko et al. | |
| 2022/0159239 A1 * | 5/2022 | Choi | H04N 19/132 |
| 2022/0182663 A1 * | 6/2022 | Choi | H04N 19/117 |
| 2022/0191478 A1 * | 6/2022 | Choi | H04N 19/11 |
| 2022/0264142 A1 * | 8/2022 | Hashimoto | H04N 19/70 |
| 2022/0385917 A1 | 12/2022 | Bordes et al. | |
| 2022/0408082 A1 * | 12/2022 | Bordes | H04N 19/70 |
| 2023/0113874 A1 | 4/2023 | Ko et al. | |
| 2024/0107074 A1 * | 3/2024 | Jang | H04N 19/52 |

OTHER PUBLICATIONS

International Search Report and Written Opinion cited in corresponding international patent application No. PCT/KR2022/009403; Sep. 29, 2022; 9 pp.

* cited by examiner

| WHETHER INTRA PREDICTION-ENCODED | | WEIGHTED VALUE(w) |
|---|---|---|
| TOP NEIGHBORING BLOCK(A) | LEFT NEIGHBORING BLOCK(L) | |
| O | O | 3 |
| O | X | 2 |
| X | O | 2 |
| X | X | 1 |

| INDEX | WEIGHTED VALUE | | | | | |
|---|---|---|---|---|---|---|
| | FIRST METHOD | | SECOND METHOD | | THIRD METHOD | |
| | $W_{intra}$ | $W_{inter}$ | $W_{intra}$ | $W_{inter}$ | $W_{intra}$ | $W_{inter}$ |
| 1 | 0.25 | 0.75 | 0.125 | 0.875 | 0.1 | 0.9 |
| 2 | 0.5 | 0.5 | 0.25 | 0.75 | 0.2 | 0.8 |
| 3 | 0.75 | 0.25 | 0.375 | 0.625 | 0.3 | 0.7 |
| 4 | - | - | 0.5 | 0.5 | 0.4 | 0.6 |
| 5 | - | - | 0.625 | 0.375 | 0.5 | 0.5 |
| 6 | - | - | 0.75 | 0.25 | 0.6 | 0.4 |
| 7 | - | - | 0.875 | 0.125 | 0.7 | 0.3 |
| 8 | | | - | - | 0.8 | 0.2 |
| 9 | | | - | - | 0.9 | 0.1 |

*FIG. 14*

| INDEX | FIRST METHOD | | | SECOND METHOD | | | THIRD METHOD | | |
|---|---|---|---|---|---|---|---|---|---|
| | WEIGHTED VALUE | | CODE WORD | WEIGHTED VALUE | | CODE WORD | WEIGHTED VALUE | | CODE WORD |
| | $W_{intra}$ | $W_{inter}$ | | $W_{intra}$ | $W_{inter}$ | | $W_{intra}$ | $W_{inter}$ | |
| 1 | 0.25 | 0.75 | 00 | 0.125 | 0.875 | 000 | 0.1 | 0.9 | 0000 |
| 2 | 0.5 | 0.5 | 01 | 0.25 | 0.75 | 001 | 0.2 | 0.8 | 0001 |
| 3 | 0.75 | 0.25 | 10 | 0.375 | 0.625 | 010 | 0.3 | 0.7 | 0010 |
| 4 | – | – | | 0.5 | 0.5 | 011 | 0.4 | 0.6 | 0011 |
| 5 | – | – | | 0.625 | 0.375 | 100 | 0.5 | 0.5 | 0100 |
| 6 | – | – | | 0.75 | 0.25 | 101 | 0.6 | 0.4 | 0101 |
| 7 | – | – | | 0.875 | 0.125 | 110 | 0.7 | 0.3 | 0110 |
| 8 | | | | – | – | | 0.8 | 0.2 | 0111 |
| 9 | | | | – | – | | 0.9 | 0.1 | 1000 |

*FIG. 15*

| INDEX | FIRST METHOD | | | SECOND METHOD | | | THIRD METHOD | | |
|---|---|---|---|---|---|---|---|---|---|
| | WEIGHTED VALUE | | CODE WORD | WEIGHTED VALUE | | CODE WORD | WEIGHTED VALUE | | CODE WORD |
| | $W_{intra}$ | $W_{inter}$ | | $W_{intra}$ | $W_{inter}$ | | $W_{intra}$ | $W_{inter}$ | |
| 1 | 0.25 | 0.75 | 0 | 0.125 | 0.875 | 00 | 0.1 | 0.9 | 000 |
| 2 | 0.5 | 0.5 | 10 | 0.25 | 0.75 | 010 | 0.2 | 0.8 | 001 |
| 3 | 0.75 | 0.25 | 11 | 0.375 | 0.625 | 011 | 0.3 | 0.7 | 010 |
| 4 | - | - | | 0.5 | 0.5 | 100 | 0.4 | 0.6 | 011 |
| 5 | - | - | | 0.625 | 0.375 | 101 | 0.5 | 0.5 | 100 |
| 6 | - | - | | 0.75 | 0.25 | 110 | 0.6 | 0.4 | 101 |
| 7 | - | - | | 0.875 | 0.125 | 111 | 0.7 | 0.3 | 110 |
| 8 | | | | - | - | | 0.8 | 0.2 | 1110 |
| 9 | | | | - | - | | 0.9 | 0.1 | 1111 |

*FIG. 16*

| INDEX | FIRST METHOD | | | SECOND METHOD | | | THIRD METHOD | | |
|---|---|---|---|---|---|---|---|---|---|
| | WEIGHTED VALUE | | CODE WORD | WEIGHTED VALUE | | CODE WORD | WEIGHTED VALUE | | CODE WORD |
| | $W_{intra}$ | $W_{inter}$ | | $W_{intra}$ | $W_{inter}$ | | $W_{intra}$ | $W_{inter}$ | |
| 1 | 0.25 | 0.75 | 0 | 0.125 | 0.875 | 0 | 0.1 | 0.9 | 0 |
| 2 | 0.5 | 0.5 | 10 | 0.25 | 0.75 | 10 | 0.2 | 0.8 | 10 |
| 3 | 0.75 | 0.25 | 11 | 0.375 | 0.625 | 110 | 0.3 | 0.7 | 110 |
| 4 | | | | 0.5 | 0.5 | 1110 | 0.4 | 0.6 | 1110 |
| 5 | | | | 0.625 | 0.375 | 11110 | 0.5 | 0.5 | 11110 |
| 6 | | | | 0.75 | 0.25 | 111110 | 0.6 | 0.4 | 111110 |
| 7 | | | | 0.875 | 0.125 | 111111 | 0.7 | 0.3 | 1111110 |
| 8 | | | | | | | 0.8 | 0.2 | 11111110 |
| 9 | | | | | | | 0.9 | 0.1 | 11111111 |

*FIG. 17*

| 3 | 3 | 3 | 3 | 3 | 3 | 2 | 2 |
|---|---|---|---|---|---|---|---|
| 3 | 3 | 3 | 3 | 3 | 2 | 2 | 2 |
| 3 | 3 | 3 | 3 | 2 | 2 | 2 | 1 |
| 3 | 3 | 3 | 2 | 2 | 2 | 1 | 1 |
| 3 | 3 | 2 | 2 | 2 | 1 | 1 | 1 |
| 3 | 2 | 2 | 2 | 1 | 1 | 1 | 1 |
| 2 | 2 | 2 | 1 | 1 | 1 | 1 | 1 |
| 2 | 2 | 1 | 1 | 1 | 1 | 1 | 1 |

FIG. 19A

| 1 | 1 | 1 | 1 | 1 | 1 | 2 | 2 |
|---|---|---|---|---|---|---|---|
| 1 | 1 | 1 | 1 | 1 | 2 | 2 | 2 |
| 1 | 1 | 1 | 1 | 2 | 2 | 2 | 3 |
| 1 | 1 | 1 | 2 | 2 | 2 | 3 | 3 |
| 1 | 1 | 2 | 2 | 2 | 3 | 3 | 3 |
| 1 | 2 | 2 | 2 | 3 | 3 | 3 | 3 |
| 2 | 2 | 2 | 3 | 3 | 3 | 3 | 3 |
| 2 | 2 | 3 | 3 | 3 | 3 | 3 | 3 |

FIG. 19B

| 3 | 3 | 3 | 3 | 3 | 3 | 3 | 3 |
|---|---|---|---|---|---|---|---|
| 3 | 3 | 3 | 3 | 3 | 3 | 3 | 3 |
| 2 | 2 | 2 | 2 | 2 | 2 | 2 | 2 |
| 2 | 2 | 2 | 2 | 2 | 2 | 2 | 2 |
| 1 | 1 | 1 | 1 | 1 | 1 | 1 | 1 |
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |

FIG. 19C

| 3 | 3 | 2 | 2 | 1 | 1 | 0 | 0 |
|---|---|---|---|---|---|---|---|
| 3 | 3 | 2 | 2 | 1 | 1 | 0 | 0 |
| 3 | 3 | 2 | 2 | 1 | 1 | 0 | 0 |
| 3 | 3 | 2 | 2 | 1 | 1 | 0 | 0 |
| 3 | 3 | 2 | 2 | 1 | 1 | 0 | 0 |
| 3 | 3 | 2 | 2 | 1 | 1 | 0 | 0 |
| 3 | 3 | 2 | 2 | 1 | 1 | 0 | 0 |
| 3 | 3 | 2 | 2 | 1 | 1 | 0 | 0 |

FIG. 19D

VIDEO ENCODING/DECODING METHOD AND APPARATUS

CROSS-REFERENCE TO RELATED APPLICATIONS

This application is a Continuation of International Application No. PCT/KR2022/009403 filed on Jun. 30, 2022, which claims priority to Korean Patent Application No. 10-2021-0086881 filed on Jul. 2, 2021, and Korean Patent Application No. 10-2022-0079202 filed on Jun. 28, 2022, the entire disclosures of each of which are incorporated herein by reference.

TECHNICAL FIELD

The present disclosure relates to a video encoding/decoding method and a video encoding/decoding apparatus. More particularly, the present disclosure relates to a video encoding/decoding method and a video encoding/decoding apparatus that generates a prediction block of a current block using a combined inter/intra prediction (CIIP) mode.

BACKGROUND

The contents described below simply provide background information related to the present embodiment and do not constitute prior art.

Since the volume of video data is larger than the volume of voice data or still image data, storing or transmitting video data without processing the video data by compression requires a lot of hardware resources including memory.

Accordingly, in storing or transmitting video data, the video data is generally compressed using an encoder so as to be stored or transmitted. Then, a decoder receives the compressed video data and decompresses and reproduces the video data. Compression techniques for such video include H.264/AVC, high efficiency video coding (HEVC), and versatile video coding (VVC), which improves coding efficiency by about 30% or more compared to HEVC.

However, the video size, resolution, and frame rate are gradually increasing, and thus the amount of data to be encoded is also increasing. Accordingly, a new compression technique having better encoding efficiency and higher image quality than the existing compression technique is required.

The combined inter/intra prediction (CIIP) mode is a method of generating a prediction block of a current block by performing a weighted average of an intra prediction signal and an inter prediction signal. When performing the CIIP, it is necessary to use various intra prediction modes and use various weighted values.

SUMMARY

An object of the present disclosure is to provide a method and an apparatus for generating a prediction block of a current block based on a combined inter/intra prediction (CIIP) mode.

Another object of the present disclosure is to provide a method and an apparatus for determining various intra prediction modes in a CIIP mode.

Another object of the present disclosure is to provide a method and an apparatus for determining various weighted values in a CIIP mode.

Another object of the present disclosure is to provide a method and an apparatus for transmitting various weighted values in a CIIP mode.

Another object of the present disclosure is to provide a method and an apparatus for improving video encoding/decoding efficiency.

Another object of the present disclosure is to provide a recording medium that stores a bitstream generated by a video encoding/decoding method or a video encoding/decoding apparatus of the present disclosure.

Another object of the present disclosure is to provide a method and an apparatus for transmitting a bitstream generated by a video encoding/decoding method or an apparatus of the present disclosure.

According to a present disclosure, a video decoding method comprises: generating an inter prediction block for a current block, based on a reference block that corresponds to the current block and exists in a reference picture. The video decoding method also comprises generating an intra prediction block for the current block, based on the reference block and a first reference pixel adjacent to the reference block. The video decoding method also comprises deriving weighted values assigned to the inter prediction block and the intra prediction block, based on not using the current block for distortion calculation. The video decoding method also comprises generating a combined inter/intra prediction (CIIP) block of the current block, based on the weighted values, the inter prediction block, and the intra prediction block.

In the video decoding method according to the present disclosure, generating the intra prediction block for the current block comprises generating a first intra prediction block, based on the first reference pixel adjacent to the reference block. Generating the intra prediction block for the current block comprises deriving an intra prediction mode, based on distortion of the first intra prediction block and the reference block. Generating the intra prediction block for the current block comprises generating the intra prediction block, based on the intra prediction mode and a second reference pixel adjacent to the current block.

In the video decoding method according to the present disclosure, wherein the weighted values are derived based on whether neighboring blocks adjacent to the current block are intra prediction-coded and inter prediction-coded.

In the video decoding method according to the present disclosure, deriving the weighted values assigned to the inter prediction block and the intra prediction block comprises deriving distortion of an inter prediction signal, deriving distortion of an intra prediction signal, and deriving the weighted values, based on the distortion of the inter prediction signal and the distortion of the intra prediction signal.

In the video decoding method according to the present disclosure, distortion of the inter prediction signal is derived based on a difference between the second reference pixel adjacent to the current block and the first reference pixel adjacent to the reference block.

In the video decoding method according to the present disclosure, deriving the distortion of the intra prediction signal comprises generating a second intra prediction block, based on the intra prediction mode and the first reference pixel adjacent to the reference block. Deriving the distortion of the intra prediction signal also comprises deriving the distortion of the intra prediction signal, based on the distortion of the second intra prediction block and the reference block.

In the video decoding method according to the present disclosure, deriving the distortion of the intra prediction signal comprises generating a third intra prediction block, based on the intra prediction mode and the second reference pixel adjacent to the current block. Deriving the distortion of the intra prediction signal also comprises deriving the distortion of the intra prediction signal, based on the distortion of the third intra prediction block and the reference block.

In the video decoding method according to the present disclosure, deriving the distortion of the intra prediction signal comprises: generating a fourth intra prediction block, based on a planar mode and the second reference pixel adjacent to the current block. Deriving the distortion of the intra prediction signal also comprises deriving the distortion of the intra prediction signal, based on distortion of the fourth intra prediction block and the reference block.

In the video decoding method according to the present disclosure, the method further comprises obtaining weighted values assigned to the inter prediction block and the intra prediction block, based on using the current block in the distortion calculation. The method further comprises generating a CIIP prediction block of the current block, based on the weighted values, the inter prediction block, and the intra prediction block. The weighted values are obtained based on index information to which the weighted values are mapped.

In the video decoding method according to the present disclosure, the weighted values are derived based on at least one of an error distribution of intra prediction or an error distribution of inter prediction.

According to the present disclosure, a video encoding method comprises generating an inter prediction block for a current block, based on a reference block that corresponds to the current block and exists in a reference picture. The video encoding method further comprises generating an intra prediction block for the current block, based on the reference block and a first reference pixel adjacent to the reference block. The video encoding method further comprises determining weighted values assigned to the inter prediction block and the intra prediction block. The video encoding method further comprises generating a combined inter/intra prediction (CIIP) block of the current block, based on the weighted values, the inter prediction block, and the intra prediction block.

In the video encoding method according to the present disclosure, generating the intra prediction block for the current block comprises generating a first intra prediction block, based on the first reference pixel adjacent to the reference block. Generating the intra prediction block for the current block also comprises determining an intra prediction mode, based on distortion of the first intra prediction block and the reference block. Generating the intra prediction block for the current block also comprises generating the intra prediction block, based on the intra prediction mode and a second reference pixel adjacent to the current block.

In the video encoding method according to the present disclosure, the weighted values are determined based on whether neighboring blocks adjacent to the current block are intra prediction-coded and inter prediction-coded.

In the video encoding method according to the present disclosure, determining the weighted values assigned to the inter prediction block and the intra prediction block comprises determining distortion of an inter prediction signal, determining distortion of an intra prediction signal, and determining the weighted values, based on the distortion of the inter prediction signal and the distortion of the intra prediction signal.

In the video encoding method according to the present disclosure, the distortion of the inter prediction signal is determined based on a difference between the second reference pixel adjacent to the current block and the first reference pixel adjacent to the reference block. Determining the distortion of the intra prediction signal comprises generating a second intra prediction block, based on the intra prediction mode and the first reference pixel adjacent to the reference block. Determining the distortion of the intra prediction signal also comprises determining the distortion of the intra prediction signal, based on the distortion of the second intra prediction block and the reference block.

In the video encoding method according to the present disclosure, determining the distortion of the intra prediction signal comprises generating a third intra prediction block, based on the intra prediction mode and the second reference pixel adjacent to the current block. Determining the distortion of the intra prediction signal also comprises determining the distortion of the intra prediction signal, based on the distortion of the third intra prediction block and the reference block.

In the video encoding method according to the present disclosure, determining the distortion of the intra prediction signal comprises generating a fourth intra prediction block, based on a planar mode and the second reference pixel adjacent to the current block. Determining the distortion of the intra prediction signal also comprises determining the distortion of the intra prediction signal, based on distortion of the fourth intra prediction block and the reference block.

In the video encoding method according to the present disclosure, the distortion of the inter prediction signal is determined based on a difference between the current block and the reference block. Determining the distortion of the intra prediction signal comprises generating a third intra prediction block, based on the intra prediction mode and the second reference pixel adjacent to the current block. Determining the distortion of the intra prediction signal also comprises determining the distortion of the intra prediction signal, based on distortion of the third intra prediction block and the current block.

In the video encoding method according to the present disclosure, determining the distortion of the intra prediction signal comprises generating a fourth intra prediction block, based on a planar mode and the second reference pixel adjacent to the current block. Determining the distortion of the intra prediction signal also comprises determining the distortion of the intra prediction signal, based on distortion of the fourth intra prediction block and the current block.

In the video encoding method according to the present disclosure, the method further comprises encoding index information to which the weighted values are mapped.

In addition, according to the present disclosure, it is possible to provide a method of transmitting a bitstream generated by the video encoding method or apparatus according to the present disclosure.

In addition, according to the present disclosure, it is possible to provide a recording medium storing a bitstream generated by the video encoding method or apparatus according to the present disclosure.

In addition, according to the present disclosure, it is possible to provide a recording medium storing a bitstream received and decoded by the video decoding apparatus according to the present disclosure and used to reconstruct a video.

According to the present disclosure, the method and an apparatus for generating a prediction block of a current block based on a combined inter/intra prediction (CIIP) mode may be provided.

In addition, according to the present disclosure, the method and an apparatus for determining various intra prediction modes in a CIIP mode may be provided.

In addition, according to the present disclosure, the method and an apparatus for determining various weighted values in a CIIP mode may be provided.

In addition, according to the present disclosure, a method and an apparatus for transmitting various weighted values in a CIIP mode may be provided.

In addition, according to the present disclosure, the method and an apparatus for improving video encoding/decoding efficiency may be provided.

The effects that may be obtained from the present disclosure are not limited to the effects mentioned above, and other effects not mentioned may be clearly understood by those having ordinary skill in the art from the description below.

BRIEF DESCRIPTION OF DRAWINGS

FIG. 8 is a diagram illustrating a method of determining a weighted value in a CIIP mode according to an embodiment of the present disclosure.

FIG. 11 is a diagram illustrating neighboring blocks referenced to determine a weighted value in a CIIP mode according to another embodiment of the present disclosure.

FIG. 14 is a diagram illustrating weighted values according to indices, according to another embodiment of the present disclosure.

FIG. 15 is a diagram illustrating a method of assigning fixed length codes to indices of weighted values, according to an embodiment of the present disclosure.

FIG. 16 is a diagram illustrating a method of assigning phased-in codes to indices of weighted values, according to an embodiment of the present disclosure.

FIG. 17 is a diagram illustrating a method of assigning variable length codes to indices of weighted values, according to an embodiment of the present disclosure.

FIGS. 19A and 19B are diagrams illustrating weighted values of intra prediction of an 8×8 block and inter prediction of an 8×8 block, according to an embodiment of the present disclosure.

FIGS. 19C and 19D are diagrams illustrating weighted values of intra prediction of an 8×8 block, according to another embodiment of the present disclosure.

DETAILED DESCRIPTION

Figure 1:
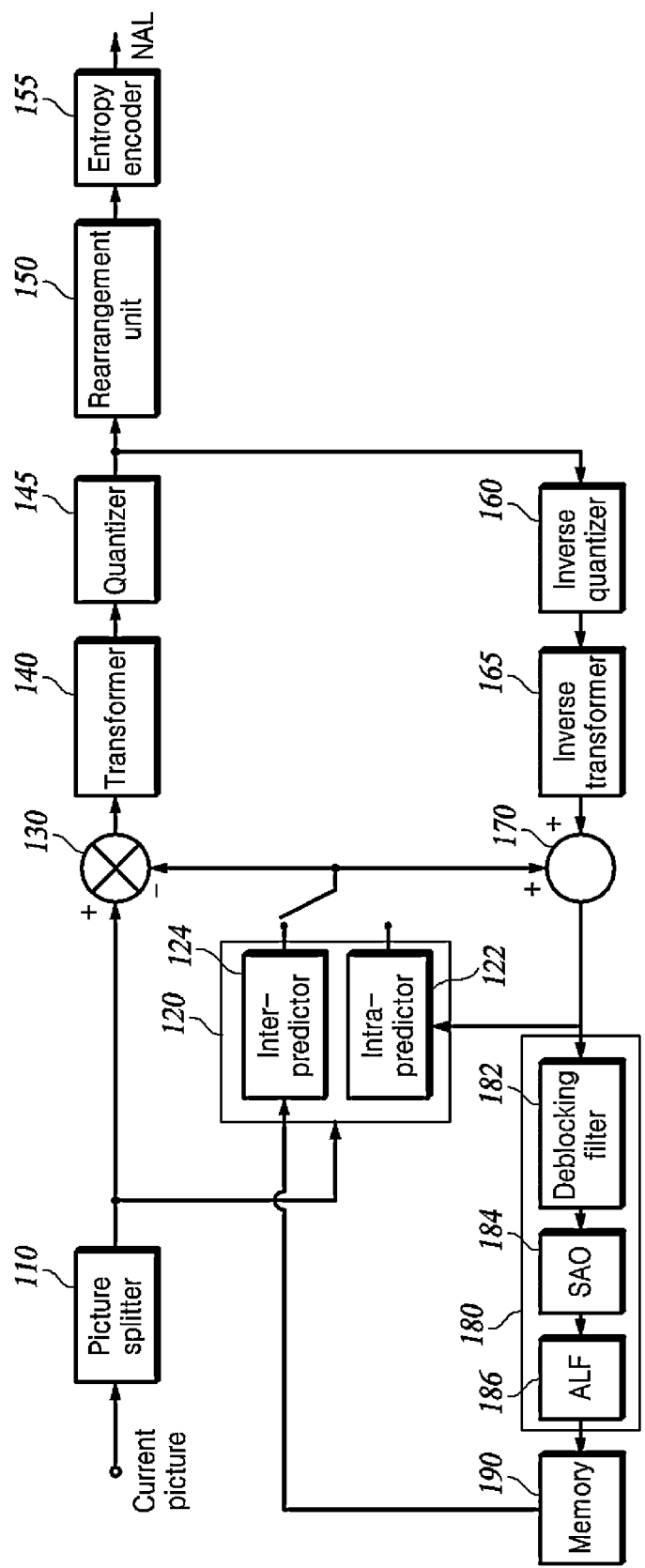
FIG. 1 is a block diagram of a video encoding apparatus that may implement a technology of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
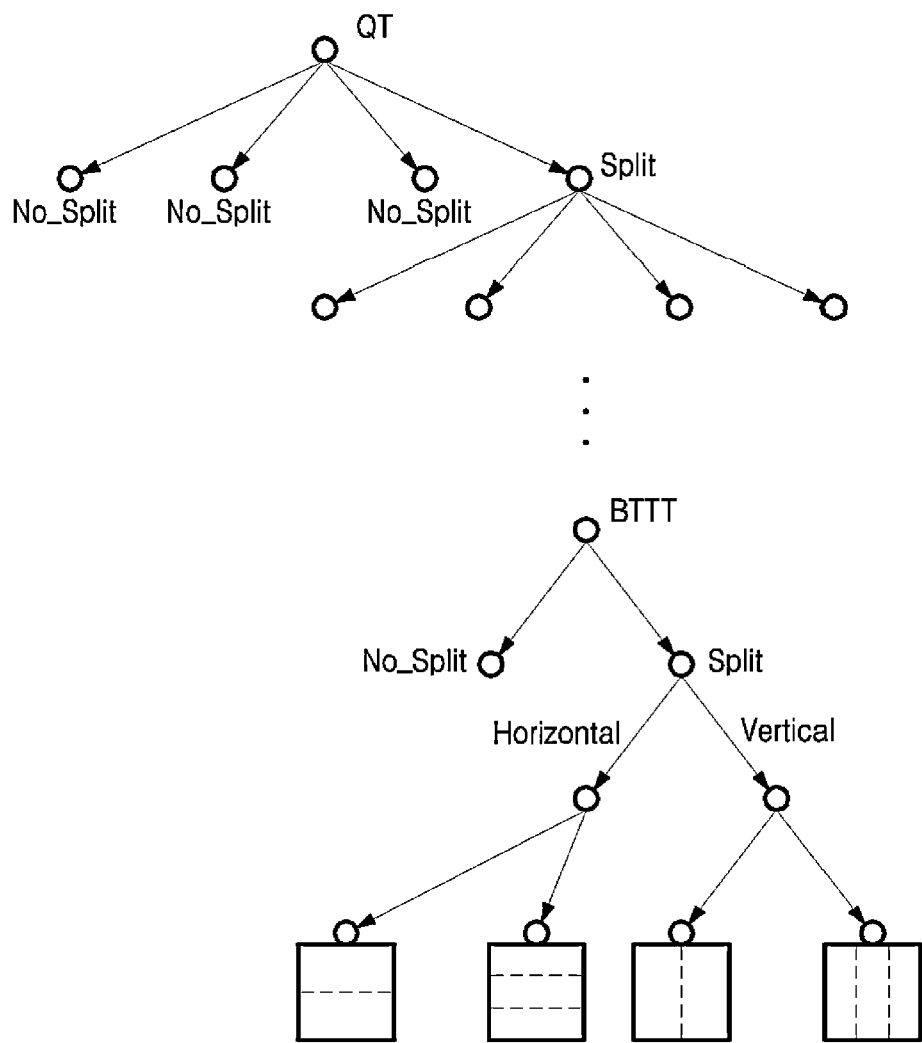
FIG. 2 illustrates a method for partitioning a block using a quadtree plus binarytree ternarytree (QTBTTT) structure.

FIG. 2 is a diagram for describing a method for splitting a block by using a QTBTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
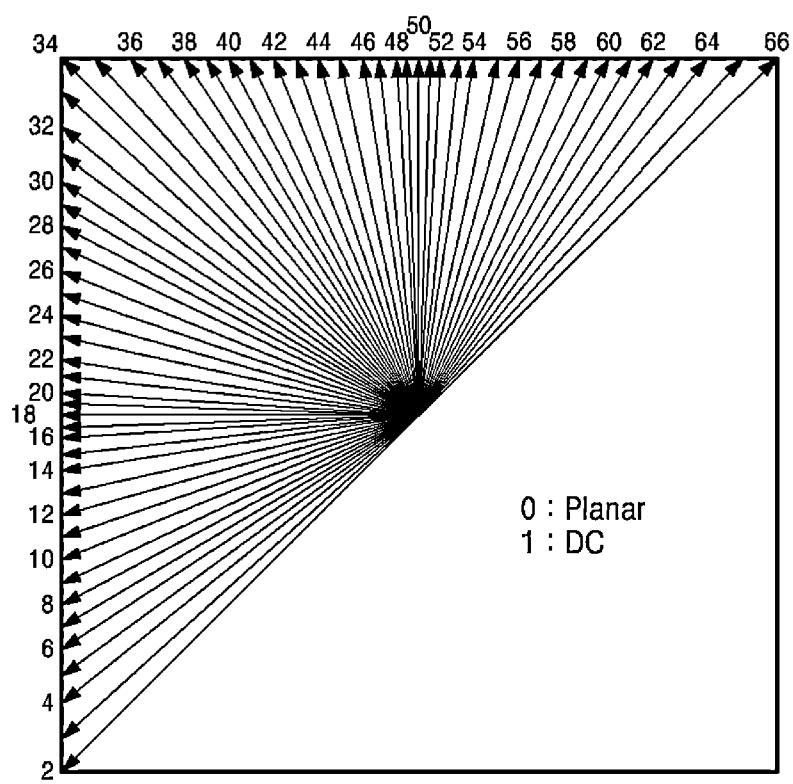
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
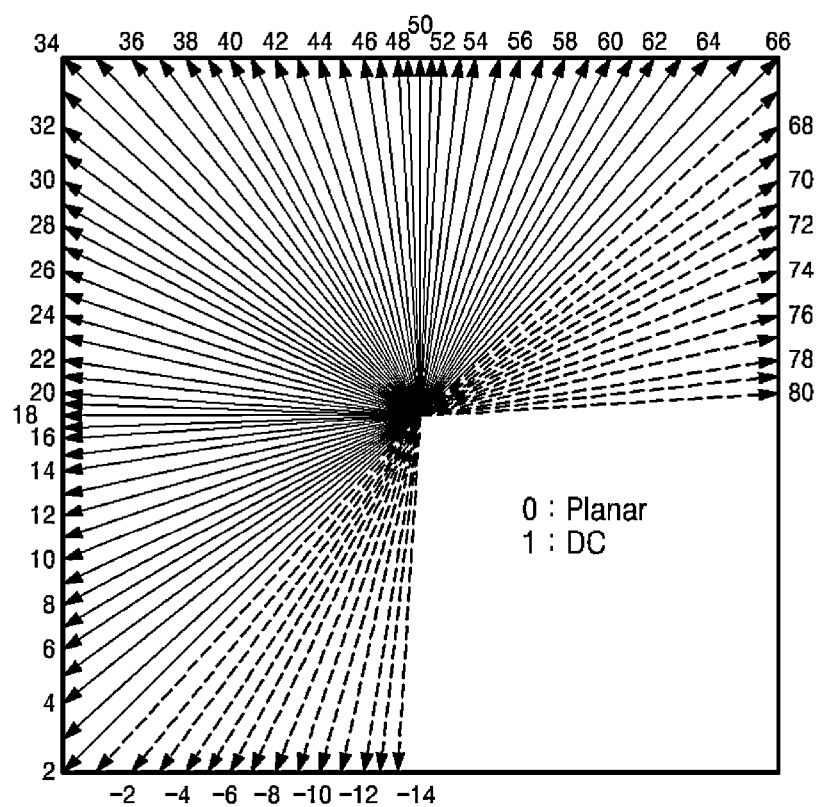

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
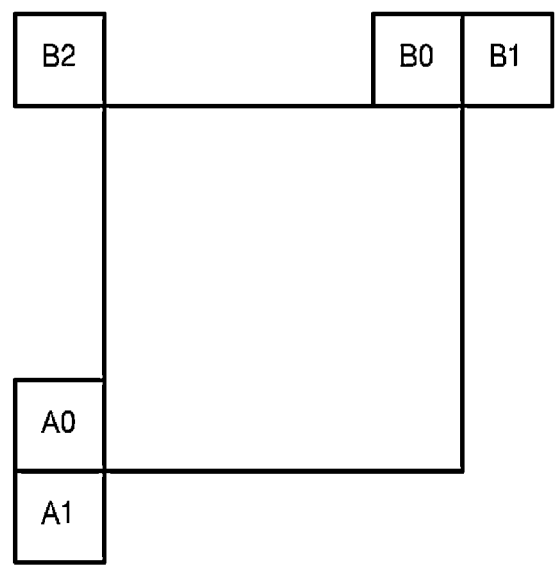
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be obtained by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
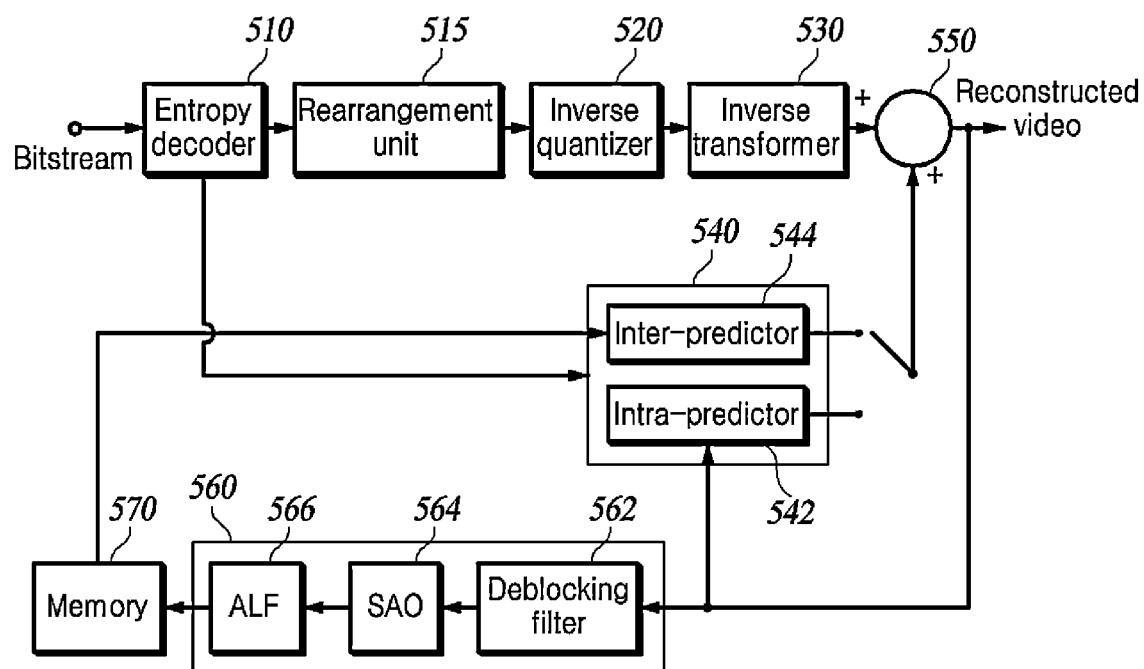
FIG. 5 is a block diagram of a video decoding apparatus that may implement technologies of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

Figure 6:
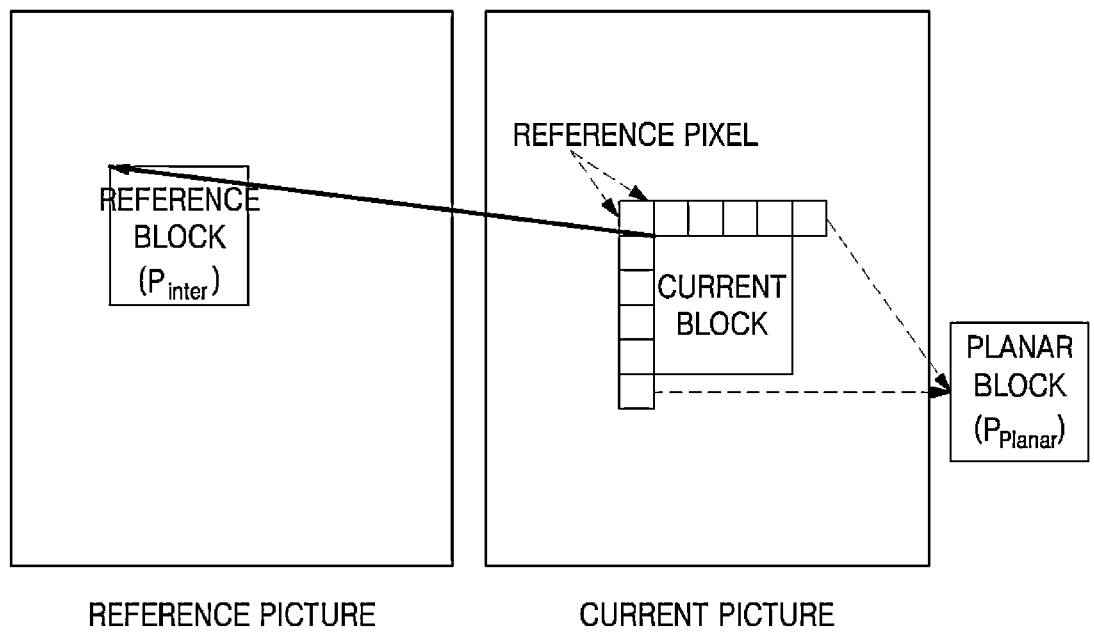
FIG. 6 is a diagram illustrating a method of generating a prediction block of a current block in a combined inter/intra prediction (CIIP) mode, according to an embodiment of the present disclosure.

FIG. 6 is a diagram illustrating a method of generating a prediction block of a current block in a combined inter/intra prediction (CIIP) mode, according to an embodiment of the present disclosure. In-picture prediction mode may have the same meaning as the intra prediction mode. In-picture prediction mode and the intra prediction mode may be used interchangeably. In-picture prediction mode may have the same meaning as the inter prediction mode. In-picture prediction mode and the inter prediction mode may be used interchangeably. The CIIP mode may have the same meaning as a combined intra/inter prediction mode. The combined intra/inter prediction mode and the CIIP mode may be used interchangeably. In the CIIP mode, an inter prediction block may be generated in the same manner as that in a general merge mode. An intra prediction block may be generated by applying a planar mode to reference pixels adjacent to the current block. A final CIIP-based prediction block may be generated by applying a weighted value to the generated inter prediction block and intra prediction block.

Referring to FIG. 6, a reference block ($P_{inter}$) within a reference picture may be derived based on the merge mode. The planar mode may be applied to reference pixels adjacent to the current block to generate an intra prediction block ($P_{Planar}$). A prediction block ($P_{CIIP}$) based on the CIIP may be generated by applying a weighted value to the corresponding reference block ($P_{inter}$) and the intra prediction block ($P_{Planar}$). The prediction block ($P_{CIIP}$) based on the CIIP may be generated using the equation of $$P_{CIIP}=((4-w) \times P_{inter}+w \times P_{Planar}+2)>>2.$$

Figure 7:
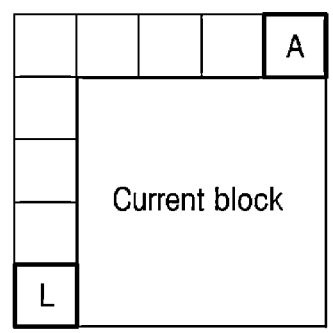
FIG. 7 is a diagram illustrating neighboring blocks referenced to determine weighted values in a CIIP mode according to an embodiment of the present disclosure.

FIG. 7 is a diagram illustrating neighboring blocks referenced to determine a weighted value in the CIIP mode, according to an embodiment of the present disclosure. In the CIIP mode, the weighted value may be determined by considering whether neighboring blocks adjacent to the current block encode the intra prediction mode.

Referring to FIG. 7, in the CIIP mode, the weighted value may be determined by considering whether the top neighboring block A and the left neighboring block L adjacent to the current block encode the intra prediction mode.

FIG. 8 is a diagram illustrating a method of determining a weighted value in a CIIP mode according to an embodiment of the present disclosure. When neighboring blocks adjacent to the current block encode many intra prediction modes, a large weighted value may be assigned to the intra prediction block. On the other hand, when neighboring blocks adjacent to the current block encode less intra prediction modes, a small weighted value may be assigned to the intra prediction block.

Referring to FIG. 8, when the top neighboring block A and the left neighboring block L of the current block of FIG. 7 encode the intra prediction mode, the weighted value assigned to the intra prediction block may correspond to 3. When the top neighboring block A encodes the intra prediction mode and the left neighboring block L does not encode the intra prediction mode, the weighted value assigned to the intra prediction block may correspond to 2. When the top neighboring block A does not encode the intra prediction mode and the left neighboring block L encodes the intra prediction mode, the weighted value assigned to the intra prediction block may correspond to 2. When the top neighboring block A does not encode the intra prediction mode and the left neighboring block L does not encode the intra prediction mode, the weighted value assigned to the intra prediction block may correspond to 1.

The CIIP mode described above with reference to FIGS. 6, 7, and 8 use the intra prediction mode fixed to the planar mode and therefore does not use directional information existing around the current block. In addition, since the weighted value is determined depending on whether a specific location block uses the intra prediction mode, there is a limit to determining the weighted value.

Figure 9:
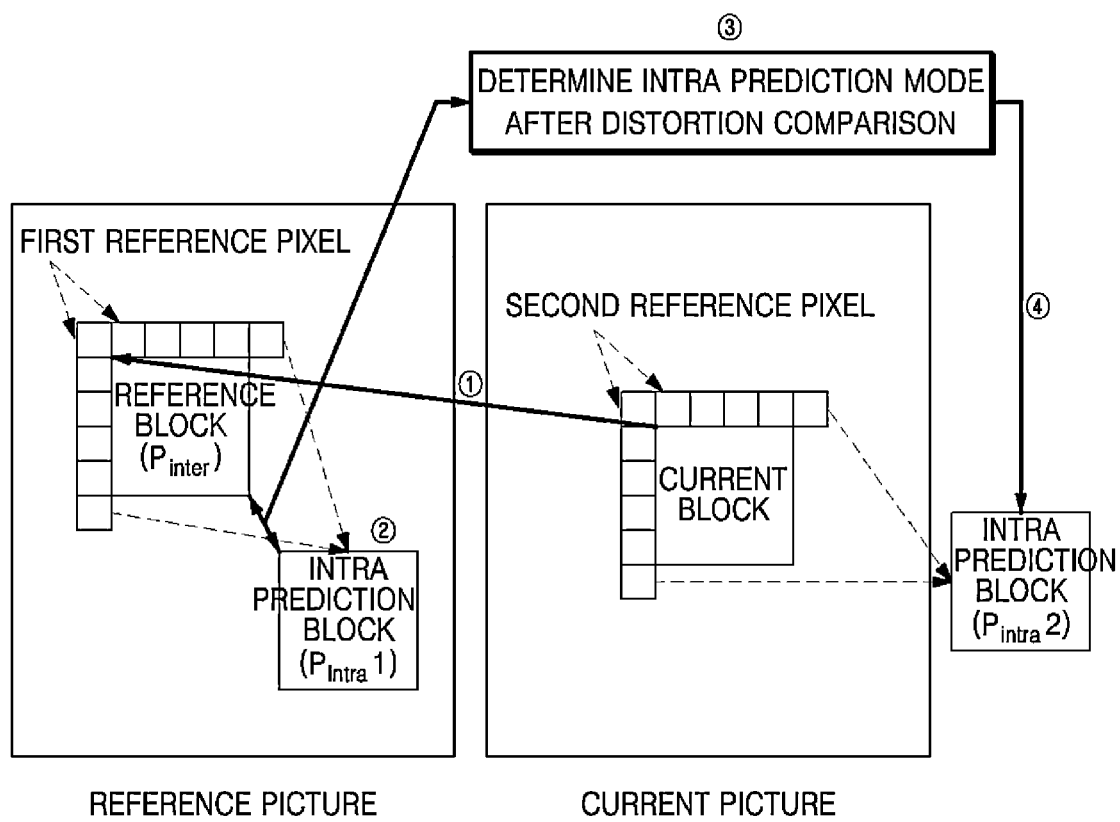
FIG. 9 is a diagram illustrating a method of using various intra prediction modes in a CIIP mode according to an embodiment of the present disclosure.

FIG. 9 is a diagram illustrating a method of using various intra prediction modes in a CIIP mode, according to an embodiment of the present disclosure.

Referring to FIG. 9, a reference block ($P_{inter}$) for the current block may be derived using the merge mode. An intra prediction block ($P_{intra}$ 1) may be generated using a first reference pixel adjacent to the corresponding reference block ($P_{inter}$). The optimal intra prediction mode may be determined by comparing distortion of the intra prediction block ($P_{intra}$ 1) and the reference block ($P_{inter}$). Here, the distortion may be calculated through various correlation measurement methods, such as SAD (Sum of Absolute Differences) or SSE (Sum of Square Error). By comparing the distortion of the intra prediction block ($P_{intra}$ 1) and the reference block ($P_{inter}$), an intra prediction mode with the least distortion may be determined as the optimal intra prediction mode. An intra prediction block ($P_{intra}$ 2) may be generated by applying the determined optimal intra prediction mode to a second reference pixel. The intra prediction block ($P_{intra}$ 2) may correspond to a final intra prediction block.

Figure 10:
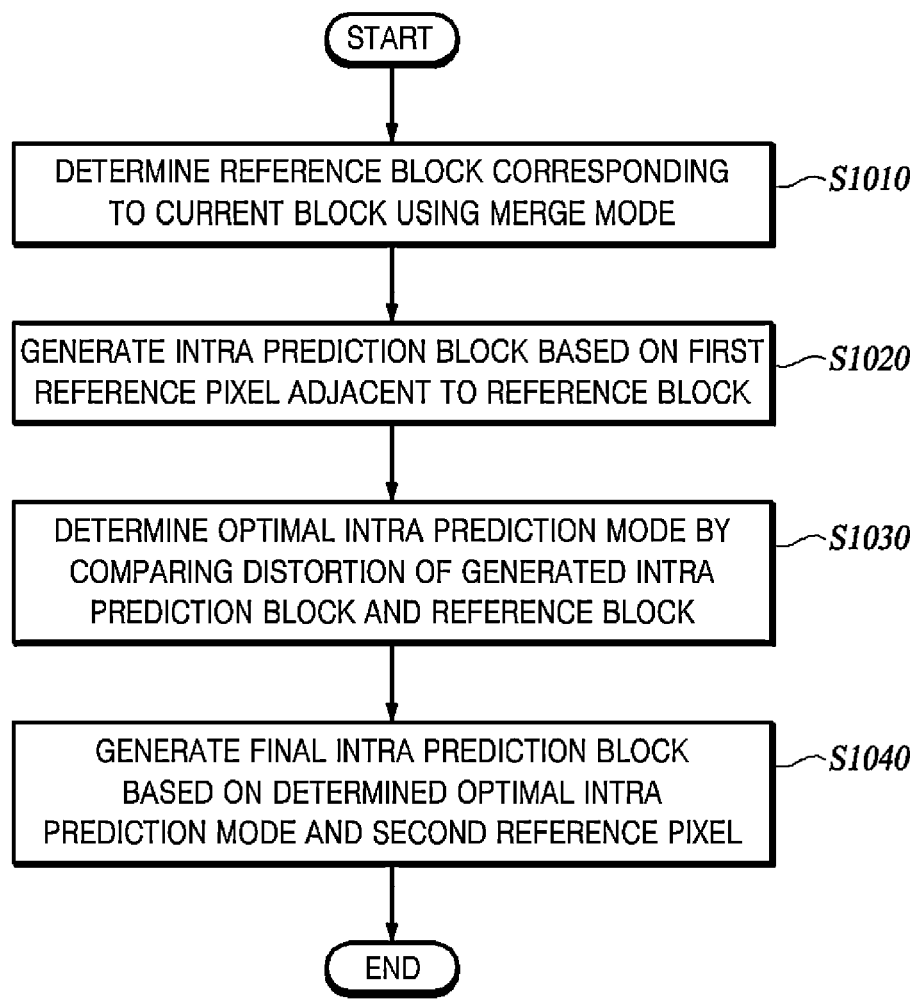
FIG. 10 is a diagram illustrating a process of determining various intra prediction modes in a CIIP mode according to an embodiment of the present disclosure.

FIG. 10 is a diagram illustrating a process of determining various intra prediction modes in a CIIP mode, according to an embodiment of the present disclosure.

Referring to FIG. 10, the encoding apparatus may determine a reference block corresponding to a current block using the merge mode (S1010). The encoding apparatus may generate an intra prediction block based on a first reference pixel adjacent to the reference block (S1020). The encoding apparatus may determine the optimal intra prediction mode by comparing distortion of the generated intra prediction block and the reference block (S1030). The encoding apparatus may generate a final intra prediction block based on the determined optimal intra prediction mode and a second reference pixel (S1040). The CIIP mode according to the present disclosure uses various intra prediction modes, and thus, coding efficiency may increase.

Figure 11:
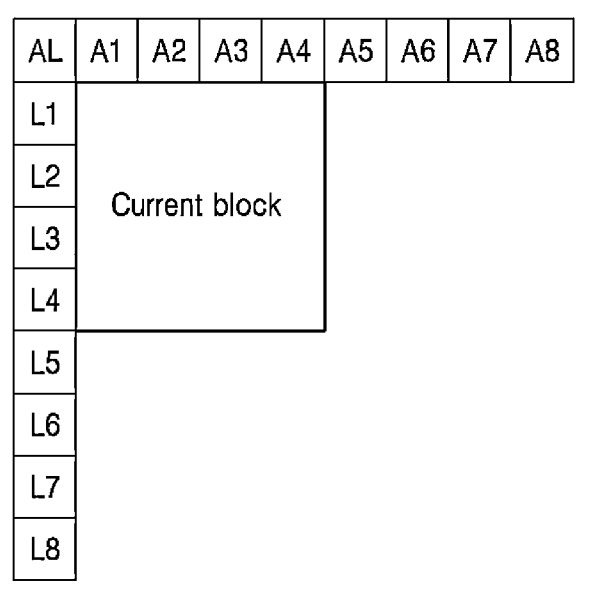

FIG. 11 is a diagram illustrating neighboring blocks referenced to determine a weighted value in a CIIP mode, according to another embodiment of the present disclosure. In the CIIP mode, information on all neighboring blocks adjacent to a current block may be used to determine a weighted value. In this case, the encoding apparatus and the decoding apparatus perform the same process to determine the weighted value, so the encoding apparatus does not need to transmit weighted value information to the decoding apparatus. This may correspond to an implicit method.

Referring to FIG. 11, the weighted value may be determined using information on neighboring blocks A1-A8, L1-L8, and AL adjacent to the current block. The corresponding weighted value may be determined by proportional distribution according to the ratio of intra prediction coding and inter prediction coding of neighboring blocks. However, the present disclosure is not limited to these embodiments. The weighted value may be determined using an arbitrary location and an arbitrary number of neighboring blocks, rather than all neighboring blocks. If the number of neighboring blocks on which intra prediction coding was performed is $N_{intra}$ and the number of neighboring blocks on which inter prediction coding was performed is $N_{inter}$, a weighted value $W_{intra}$ assigned to the intra prediction block may be calculated as $$W_{intra} = \frac{N_{intra}}{N_{intra} + N_{inter}}$$

and a weighted value $W_{inter}$ assigned to the inter prediction block may be calculated as $$W_{inter} = \frac{N_{inter}}{N_{intra} + N_{inter}}.$$

The method of determining a weighted value according to the present disclosure may have high accuracy because the weighted value is calculated using all neighboring blocks adjacent to the current block. Accordingly, coding efficiency of the CIIP mode may be improved.

Figure 12:
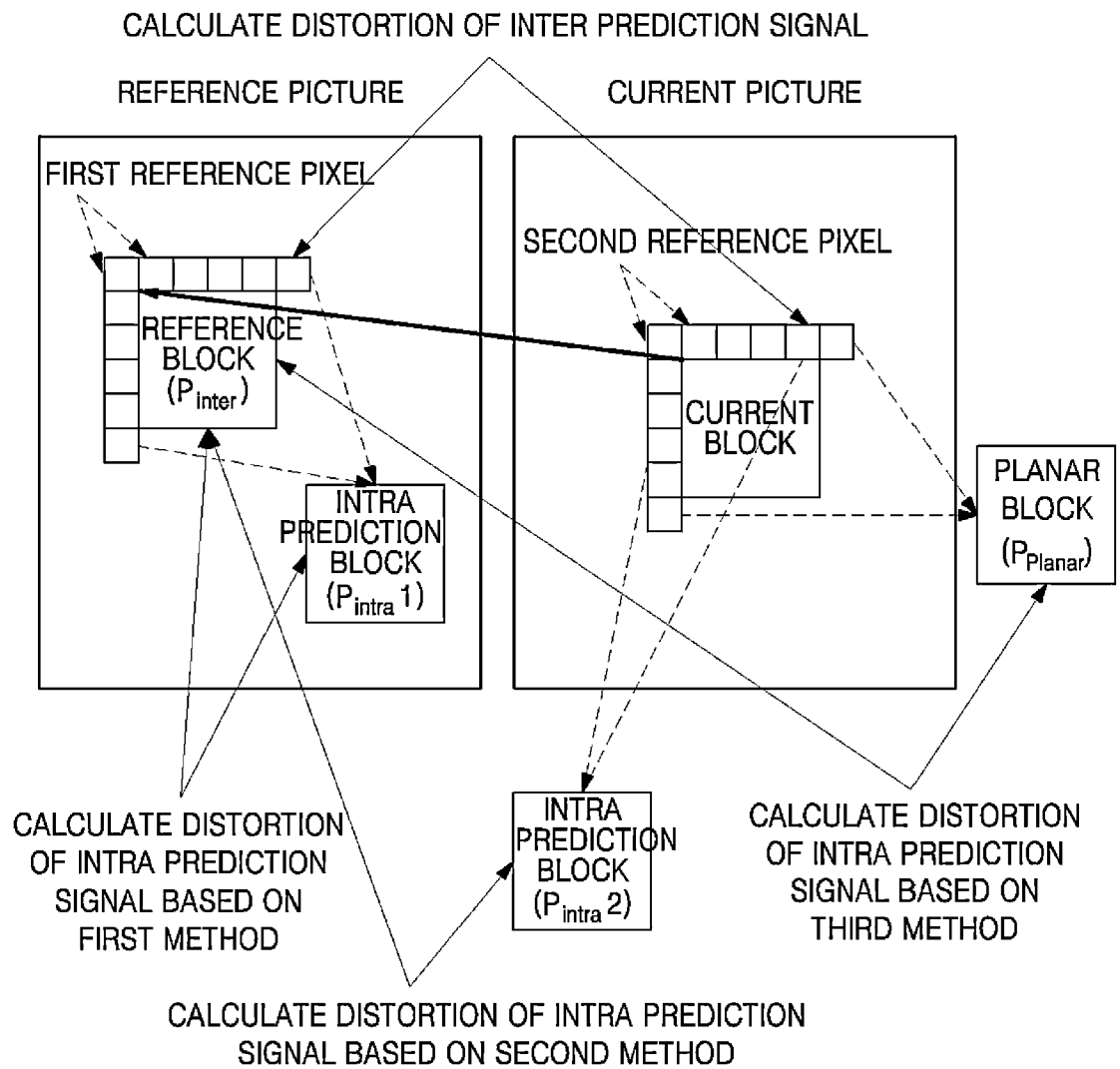
FIG. 12 is a diagram illustrating a method of determining a weighted value in a CIIP mode according to another embodiment of the present disclosure.

FIG. 12 is a diagram illustrating a method of determining a weighted value in a CIIP mode, according to another embodiment of the present disclosure. In the CIIP mode, a weighted value may be calculated using distortion. The corresponding weighted value may be calculated based on distortion of an intra prediction signal and distortion of an inter prediction signal. In this case, the encoding apparatus and the decoding apparatus perform the same process to determine the weighted value, so the encoding apparatus does not need to transmit the weighted value information to the decoding apparatus. This may correspond to an implicit method.

Referring to FIG. 12, distortion of the inter prediction signal may be determined by calculating a difference between a second reference pixel adjacent to the current block and a first reference pixel adjacent to the reference block ($P_{inter}$) determined in the merge mode.

Distortion of the intra prediction signal may be calculated according to three methods. Referring to a first method, an intra prediction block may be generated using a first reference pixel adjacent to the reference block ($P_{inter}$). The optimal intra prediction mode may be determined by comparing the distortion of the corresponding intra prediction block and the reference block ($P_{inter}$). An intra prediction block ($P_{intra}$ 1) may be generated by applying the determined optimal intra prediction mode to the first reference pixel. The distortion of the intra prediction signal may be calculated by calculating distortion of the intra prediction block ($P_{intra}$ 1) with the reference block ($P_{inter}$).

Referring to a second method, an intra prediction block may be generated using a first reference pixel adjacent to the reference block ($P_{inter}$). The optimal intra prediction mode may be determined by comparing distortion of the intra prediction block and the reference block ($P_{inter}$). An intra prediction block ($P_{intra}$ 2) may be generated by applying the determined optimal intra prediction mode to the second reference pixel. The distortion of the intra prediction signal may be calculated by calculating the distortion of the intra prediction block ($P_{intra}$ 2) and the reference block ($P_{inter}$).

Referring to a third method, an intra prediction block ($P_{planar}$) based on the planar mode may be generated by applying the planar mode to the second reference pixel. Distortion of the intra picture prediction signal may be calculated by calculating distortion of the intra prediction block ($P_{planar}$) based on the planar mode and the reference block ($P_{inter}$).

Distortion of the intra prediction signal may be calculated by selecting any of the three methods described above. When the distortion of the inter prediction signal is $D_{inter}$ and the distortion of the intra prediction signal is $D_{intra}$, a weighted value $W_{inter}$ assigned to the inter prediction signal may be calculated as $$W_{inter} = \frac{D_{intra}}{D_{intra} + D_{inter}},$$

and a weighted value $W_{intra}$ assigned to the intra prediction signal may be calculated as $$W_{intra} = \frac{D_{inter}}{D_{intra} + D_{inter}}.$$

The weighted value $W_{inter}$ assigned to the inter prediction signal may be calculated using $D_{intra}$, the distortion of the intra prediction signal, and the weighted value $W_{intra}$ assigned to the intra prediction signal may be calculated using $D_{inter}$, the distortion of the inter prediction signal. This considers that, as the distortion value decreases, the similarity between the predicted signal and the original signal increases, and as the distortion value increases, the similarity between the predicted signal and the original signal decreases. Here, the distortion may be calculated through various correlation measurement methods, such as SAD or SSE. The method of calculating a weighted value based on distortion according to the present disclosure may improve encoding efficiency by accurately calculating the weighted value.

Figure 13:
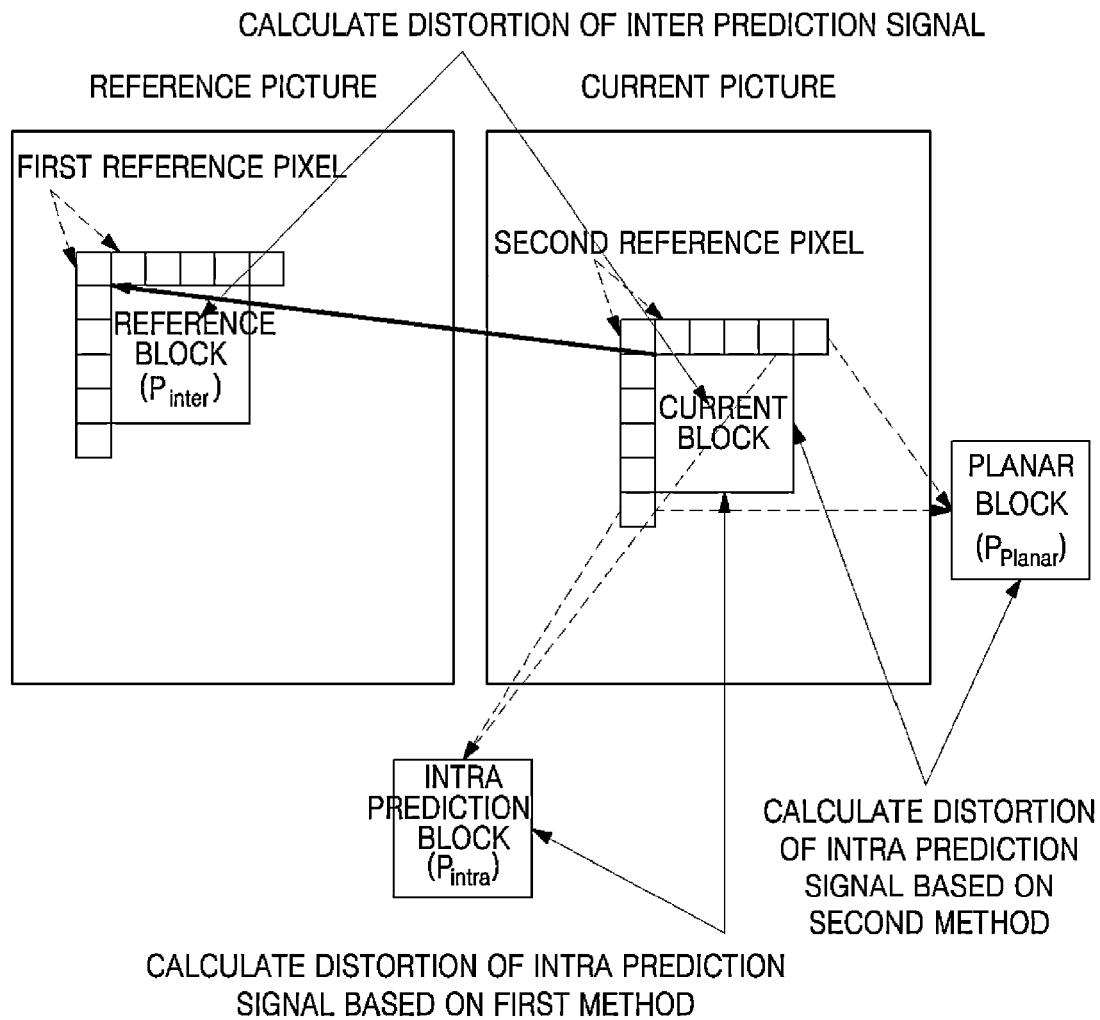
FIG. 13 is a diagram illustrating a method of determining a weighted value in a CIIP mode according to another embodiment of the present disclosure.

FIG. 13 is a diagram illustrating a method of determining a weighted value in a CIIP mode, according to another embodiment of the present disclosure. In the CIIP mode, a weighted value may be calculated using distortion. The corresponding weighted value may be calculated based on distortion of an intra prediction signal and distortion of an inter prediction signal. In this case, the encoding apparatus may calculate distortion using information of a current block, which is an original signal that cannot be used by the decoding apparatus. Accordingly, the encoding apparatus should transmit information on the weighted value calculated using distortion to the decoding apparatus. This may correspond to an explicit method.

Referring to FIG. 13, distortion of the inter prediction signal may be determined by calculating a difference between the current block and the reference block ($P_{inter}$). The encoding apparatus may use information on the current block that the decoding apparatus cannot use.

Distortion of the intra prediction signal may be calculated according to two methods. Referring to a first method, an intra prediction block may be generated using a first reference pixel adjacent to the reference block ($P_{inter}$). The optimal intra prediction mode may be determined by comparing distortion of the intra prediction block and the reference block ($P_{inter}$). An intra prediction block ($P_{intra}$) may be generated by applying the determined optimal intra prediction mode to the second reference pixel. The distortion of the intra prediction signal may be calculated by calculating the distortion of the current block and the intra prediction block ($P_{intra}$).

Referring to a second method, an intra prediction block ($P_{planar}$) based on the planar mode may be generated by applying the planar mode to the second reference pixel. Distortion of the intra prediction signal may be calculated by calculating the distortion of the intra prediction block ($P_{planar}$) based on the planar mode and the current block.

Distortion of the intra prediction signal may be calculated by selecting any of the two methods described above. When the distortion of the inter prediction signal is $D_{inter}$ and the distortion of the intra prediction signal is $D_{intra}$, the weighted value $W_{inter}$ assigned to the inter prediction signal may be calculated as $$W_{inter} = \frac{D_{intra}}{D_{intra} + D_{inter}},$$

and the weighted value $W_{intra}$ assigned to the intra prediction signal may be calculated as $$W_{intra} = \frac{D_{inter}}{D_{intra} + D_{inter}}.$$

The weighted value $W_{inter}$ assigned to the inter prediction signal may be calculated using $D_{intra}$, which is the distortion of the intra prediction signal, and the weighted value $W_{intra}$ assigned to the intra prediction signal may be calculated using $D_{inter}$, which is the distortion of the inter prediction signal. This considers that, as the distortion value decreases, the similarity between the predicted signal and the original signal increases, and as the distortion value increases, the similarity between the predicted signal and the original signal decreases. Here, the distortion may be calculated through various correlation measurement methods, such as SAD or SSE. The method of calculating a weighted value based on distortion according to the present disclosure may improve encoding efficiency by accurately calculating the weighted value.

FIG. 14 is a diagram illustrating weighted values according to indices, according to another embodiment of the present disclosure. In the case of calculating a weighted value based on distortion according to FIG. 13, the encoding apparatus may calculate the distortion using information on the current block that the decoding apparatus cannot use. Accordingly, the encoding apparatus should transmit information on the weighted value calculated according to the distortion to the decoding apparatus. In general, the weighted value may correspond to any decimal value between 0 and 1. A lot of bits may be required to transmit the weighted value corresponding to the decimal value. The encoding apparatus may map information on the weighted value having the decimal value to a predefined table and transmit the corresponding index to the decoding apparatus. Accordingly, transmission bits may be reduced.

Referring to FIG. 14, there may be three methods to map the weighted value to the indices. Method 1 may correspond to a method of using three weighted values of 0.25, 0.5, and 0.75 and indices from 1 to 3. Method 2 may correspond to a method of using a total of 7 weighted values from 0.125 to 0.875 at 0.125 intervals and using indices from 1 to 7. Method 3 may correspond to a method of using a total of 9 weighted values from 0.1 to 0.9 at 0.1 intervals and using indices from 1 to 9. However, the present disclosure is not limited to these embodiments. Weighted values may be used in any number and with any value.

The weighted value calculated in FIG. 13 may be compared with the weighted value used in one method selected from among the three methods in FIG. 14. As a result of the comparison, an index having the most similar weighted value may be determined. Prediction in the CIIP mode may be performed using the weighted value $W_{intra}$ of the intra prediction signal and the weighted value $W_{inter}$ of the inter prediction signal of the determined index. The encoding apparatus may transmit the determined index to the decoding apparatus. As an example, when the calculated weighted value $W_{intra}$ of the intra prediction signal and the weighted value $W_{inter}$ of the inter prediction signal are 0.358 and 0.642, respectively, and Method 2 is selected in FIG. 14, the determined index is 3, and the weight value $W_{intra}$ of the intra prediction signal and the weight value $W_{inter}$ corresponding to the index 3 may correspond to 0.375 and 0.625, respectively. Accordingly, prediction in the CIIP mode may be performed using the weighted value of 0.375 for the intra prediction signal and the weighted value of 0.625 for the inter prediction signal. Also, the encoding apparatus may transmit the index 3 to the decoding apparatus.

FIG. 15 is a diagram illustrating a method of assigning a fixed length code to an index of a weighted value, according to an embodiment of the present disclosure. The index of the weighted value may be determined, and the determined index may be transmitted using a fixed length code (FLC). In the case of transmitting an index using the fixed length code, code words having the same length may be assigned to all indices.

Referring to FIG. 15, Method 1 may assign a 2-bit fixed length code to the index. Method 2 may assign a 3-bit fixed length code to the index. Method 3 may assign a 4-bit fixed length code to the index. Each method does not sufficiently use the code words available for the corresponding bit. Method 1 does not use code word 11. Method 2 does not use code word 111. Method 3 does not use code words 1001, 1010, 1011, 1100, 1101, 1110, and 1111. Accordingly, coding efficiency may be lowered. However, the present disclosure is not limited to these embodiments. The method of mapping code words to indices using fixed length codes may be arbitrarily determined.

FIG. 16 is a diagram illustrating a method of assigning a phased-in code to an index of a weighted value, according to an embodiment of the present disclosure. To solve the problem of low coding efficiency in FIG. 15, a code word may be assigned to an index using the phased-in code.

Referring to FIG. 16, when a phased-in code is used, a code may be assigned to an index without wasting code words even when a fixed length code is used. Although the phased-in code is a fixed length code, codes of different lengths may be used. Accordingly, a short code word may be assigned to an index with a high frequency of occurrence and a long code word may be assigned to an index with a low frequency of occurrence. Coding efficiency may be improved because there is no waste of code words. However, the present disclosure is not limited to these embodiments. The method of mapping code words to indices using phased-in codes may be arbitrarily determined.

FIG. 17 is a diagram illustrating a method of assigning a variable length code to an index of a weighted value, according to an embodiment of the present disclosure. A method of assigning a variable length code to an index of a weighted value may correspond to a method of assigning code words of different lengths to the index. A short code word may be assigned to an index with a high frequency of occurrence, and a long code word may be assigned to an index with a low frequency of occurrence. Accordingly, coding efficiency may be improved. Based on offline training, the frequency of occurrence for each index may be inspected.

Referring to FIG. 17, a code word may be assigned using a truncated rice (TR) code. Method 1 may generate a code word using a TR code with cMAX=2 and cRiceParam=0. Method 2 may generate a code word using a TR code with cMAX=6 and cRiceParam=0. Method 3 may generate a code word using the TR code with cMAX=8 and cRiceParam=0. The generated code words may be assigned to indices in order. However, the present disclosure is not limited to these embodiments. A variable-length code may be assigned to the index using any code other than the TR code. Based on offline training, a small index may be assigned to a weighted value with a high frequency of occurrence and a large index may be assigned to a weighted value with a low frequency of occurrence. Thereafter, a short code word may be assigned to a weighted value with a high frequency of occurrence and a long code word may be assigned to a weighted value with a low frequency of occurrence. Accordingly, coding efficiency may be improved.

Figure 18A:
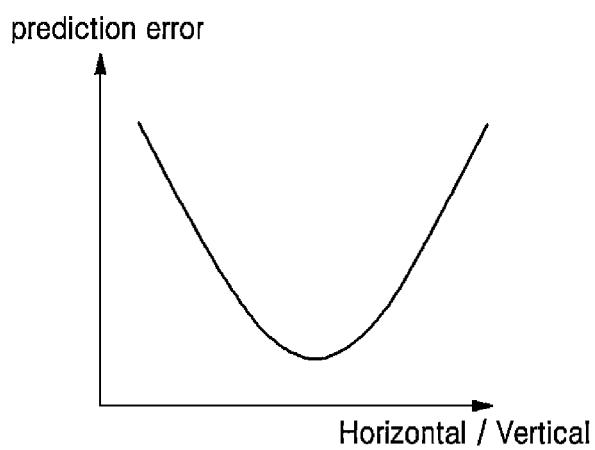
FIGS. 18A and 18B are diagrams illustrating an error distribution of inter prediction and an error distribution of intra prediction, according to an embodiment of the present disclosure.
Figure 18B:
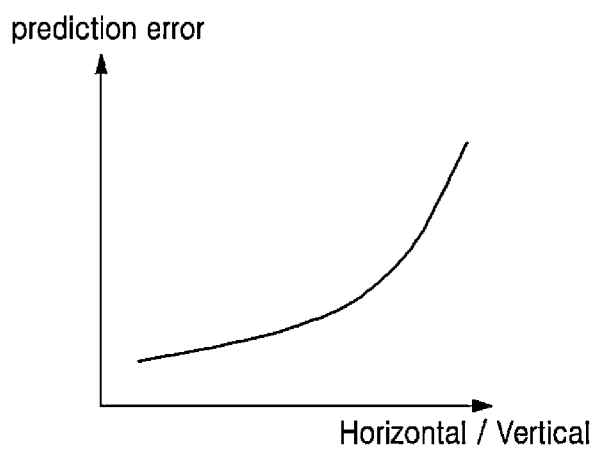

FIGS. 18A and 18B are diagrams illustrating an error distribution of inter prediction and an error distribution of intra prediction, according to an embodiment of the present disclosure.

Referring to FIG. 18A, an error distribution of inter prediction may appear according to horizontal/vertical coordinate values. In inter prediction, a motion vector may be used based on the center of the current block. Accordingly, an error in inter prediction may increase away from the center of the current block increases.

Referring to FIG. 18B, an error distribution of intra prediction may appear according to horizontal/vertical coordinate values. In intra prediction, a reference block used during prediction may be in the top left of the current block. Accordingly, the error in the intra prediction may increase from the top left to the bottom right.

FIGS. 19A and 19B are diagrams illustrating weighted values of intra prediction of an 8×8 block and inter prediction of an 8×8 block, according to an embodiment of the present disclosure. In intra prediction, a reference block used during prediction may be in the top left of the current block. Accordingly, in the top left region of the current block, a large weighted value may be assigned to the intra prediction signal, and in the bottom right region of the current block, a large weight value may be assigned to the inter prediction signal.

Referring to FIG. 19A, in the top left region of an 8×8 block, a large weighted value may be assigned to the intra prediction signal, and in the bottom right region, a small weighted value may be assigned to the intra prediction signal.

Referring to FIG. 19B, in the bottom right region of the 8×8 block, a large weighted value may be assigned the intra prediction signal, and in the top left region, a small weight value may be assigned to the intra prediction signal. However, the present disclosure is not limited to these embodiments. The size and shape of blocks may correspond to a certain size and shape. The assigned weighted value may correspond to a certain weighted value.

FIGS. 19C and 19D are diagrams illustrating weighted values of intra prediction of an 8×8 block, according to another embodiment of the present disclosure. In intra prediction, reference blocks used during prediction may exist on top and the left of the current block. Accordingly, a large weighted value may be assigned to the intra prediction signal in a region close to the top reference block and the left reference block of the current block.

Referring to FIG. 19C, in the top region of the 8×8 size block, a large weighted value may be assigned to the intra prediction signal, and in the bottom region, a small weighted value may be assigned to the intra prediction signal.

Referring to FIG. 19D, in the left region of the 8×8 block, a large weighted value may be assigned to the intra prediction signal, and in the right region, a small weighted value may be assigned to the intra prediction signal. However, the present disclosure is not limited to these embodiments. The size and shape of blocks may correspond to a certain size and shape. The assigned weighted value may correspond to a certain weighted value.

Figure 20:
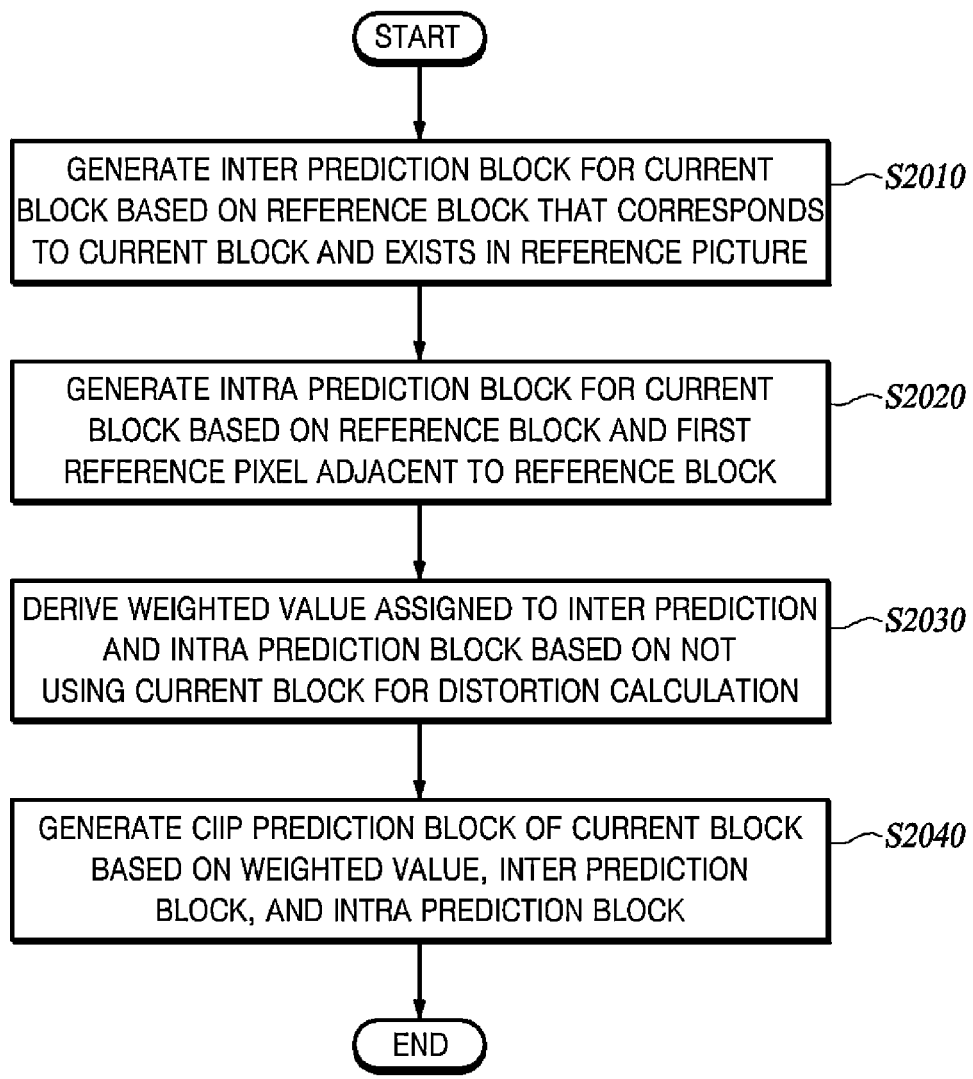
FIG. 20 is a diagram illustrating a video decoding process, according to an embodiment of the present disclosure.

FIG. 20 is a diagram illustrating a video decoding process, according to an embodiment of the present disclosure.

Referring to FIG. 20, the decoding apparatus may generate an inter prediction block for a current block based on a reference block that corresponds to the current block and exists in a reference picture (S2010). Also, the decoding apparatus may generate an intra prediction block for the current block based on the reference block and a first reference pixel adjacent to the reference block (S2020). The generating of the intra prediction block for the current block may include generating a first intra prediction block based on the first reference pixel adjacent to the reference block, deriving an intra prediction mode based on distortion of the reference block and the first intra prediction block, and generating the intra prediction block based on the intra prediction mode and a second reference pixel adjacent to the current block.

In addition, the decoding apparatus may derive weighted values assigned to the inter prediction block and intra prediction block based on not using the current block for distortion calculation (S2030). The weighted values may be derived based on whether neighboring blocks adjacent to the current block are intra prediction encoded and inter prediction encoded. The deriving of the weighted values assigned to inter prediction blocks and intra prediction blocks may include deriving distortion of an inter prediction signal, deriving distortion of an intra prediction signal, and deriving weighted values based on distortion of the inter prediction signal and distortion of the intra prediction signal. Distortion of the inter prediction signal may be derived based on a difference between the second reference pixel adjacent to the current block and the first reference pixel adjacent to the reference block.

The deriving of distortion of the intra prediction signal may include generating a second intra prediction block based on the intra prediction mode and the first reference pixel adjacent to the reference block and deriving distortion of the intra prediction signal based on the distortion of the second intra prediction block and the reference block. Deriving of the distortion of the intra prediction signal may include generating a third intra prediction block based on the intra prediction mode and the second reference pixel adjacent to the current block and deriving distortion of the intra prediction signal based on the reference block and the third intra prediction block. The deriving of the distortion of the intra prediction signal may include generating a fourth intra prediction block based on the planar mode and the second reference pixel adjacent to the current block and deriving the distortion of the intra prediction signal based on the reference block and the distortion of the fourth intra prediction block. The decoding apparatus may obtain weighted values assigned to the inter prediction block and intra prediction block based on the use of the current block for distortion calculation. The corresponding weighted value may be obtained based on index information to which the weighted values are mapped. The weighted values may be derived based on at least one of an error distribution of intra prediction and an error distribution of inter prediction. Also, the decoding apparatus may generate a CIIP prediction block of the current block based on the weighted values, the inter prediction block, and the intra prediction block (S2040).

Figure 21:
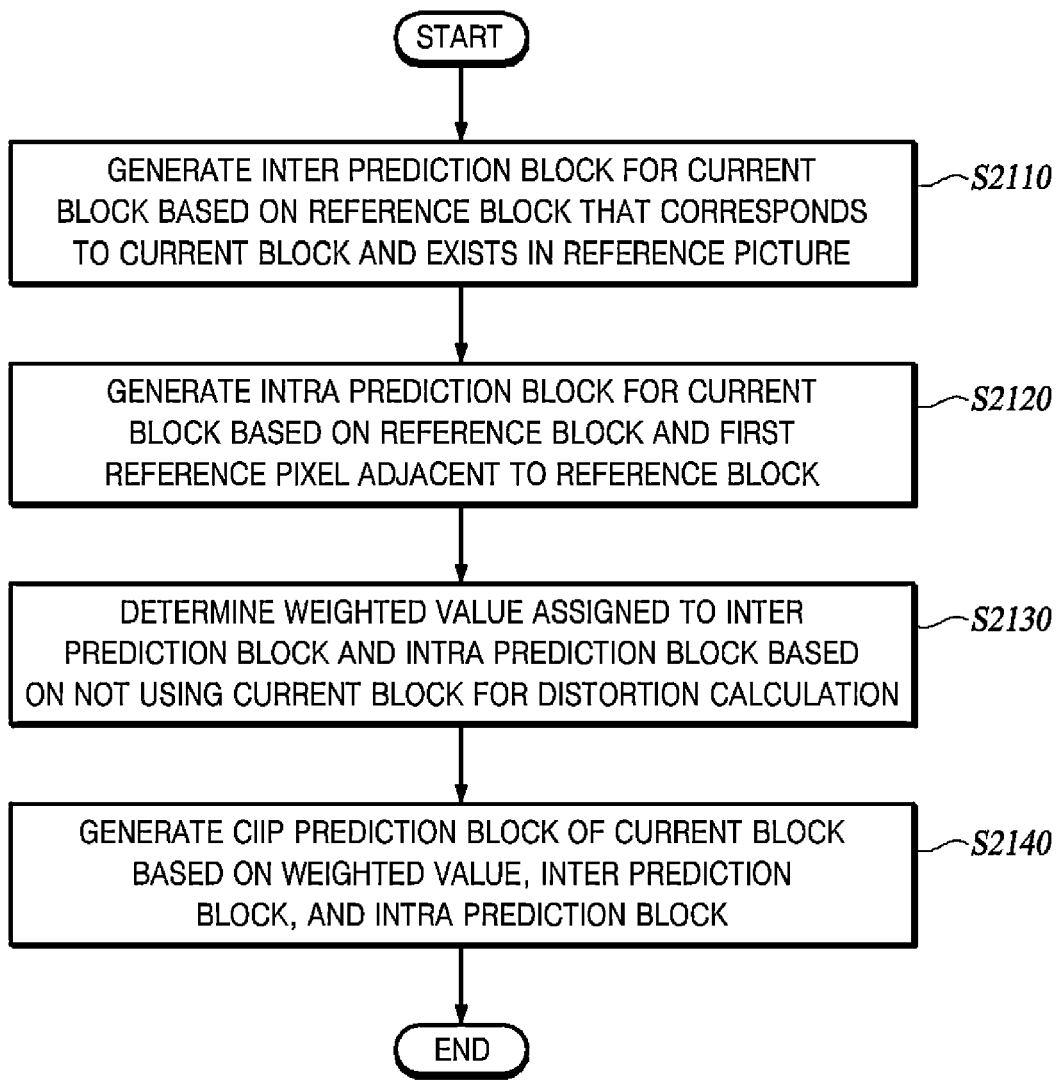
FIG. 21 is a diagram illustrating a video encoding process, according to an embodiment of the present disclosure.

FIG. 21 is a diagram illustrating a video encoding process, according to an embodiment of the present disclosure.

Referring to FIG. 21, the encoding apparatus may generate an inter prediction block for a current block based on a reference block that corresponds to the current block and exists in the reference picture (S2110). In addition, the encoding apparatus may generate an intra prediction block for the current block based on the reference block and a first reference pixel adjacent to the reference block (S2120). The generating of the intra prediction block for the current block may include generating a first intra prediction block based on the first reference pixel adjacent to the reference block, deriving the intra prediction mode based on distortion of the reference block and the first intra prediction block, and generating the intra prediction block based on the intra prediction mode and a second reference pixel adjacent to the current block.

In addition, the encoding apparatus may determine weighted values assigned to the inter prediction block and intra prediction block based on not using the current block for distortion calculation (S2130). The weighted values may be determined based on whether neighboring blocks adjacent to the current block are intra prediction-encoded and inter prediction-encoded. The determining the weighted values assigned to the inter prediction block and the intra prediction block may include determining distortion of an inter prediction signal, determining distortion of an intra prediction signal, and determining the weighted values based on the distortion of the inter prediction signal and the distortion of the intra prediction signal. The distortion of the inter prediction signal may be determined based on a difference between the second reference pixel adjacent to the current block and the first reference pixel adjacent to the reference block.

The determining of the distortion of the intra prediction signal may include generating a second intra prediction block based on the intra prediction mode and the first reference pixel adjacent to the reference block and determining the distortion of the intra prediction signal based on the reference block and the distortion of the second intra prediction block. The determining of the distortion of the intra prediction signal may include generating a third intra prediction block based on the intra prediction mode and the second reference pixel adjacent to the current block and determining the distortion of the intra prediction signal based on the reference block and the third intra prediction block. The determining of the distortion of the intra prediction signal may include generating a fourth intra prediction block based on the planar mode and the second reference pixel adjacent to the current block and determining the distortion of the intra prediction signal based on the reference block and the fourth intra prediction block.

Distortion of the inter prediction signal may be determined based on a difference between the current block and the reference block. The determining of the distortion of the intra prediction signal may include generating a third intra prediction block based on the intra prediction mode and the second reference pixel adjacent to the current block and determining the distortion of the intra prediction signal based on the current block and the third intra prediction block. The determining of the distortion of the intra prediction signal may include generating a fourth intra prediction block based on the planar mode and the second reference pixel adjacent to the current block and determining the distortion of the intra prediction signal based on the current block and the fourth intra prediction block. Encoding the index information to which the weighted value is mapped may be included. Also, the encoding apparatus may generate a CIIP prediction block of the current block based on the weighted value, the inter prediction block, and the intra prediction block (S2140).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMBER

122: intra predictor
510: entropy decoder
542: intra predictor

What is claimed is:

1. A video decoding method comprising:
generating an inter prediction block for a current block, based on a reference block that corresponds to the current block and exists in a reference picture;
generating an intra prediction block for the current block, based on reference pixels adjacent to the current block;
determining weighted values assigned to the inter prediction block and the intra prediction block, based on a plurality of regions in the current block; and
generating a combined inter/intra prediction (CIIP) block of the current block, based on the weighted values, the inter prediction block, and the intra prediction block,
wherein the weighted values assigned to the intra prediction block have different values for each of the plurality of regions in the current block, and
wherein the weighted values assigned to the intra prediction block decrease from an upper region to a lower region of the current block or from a left region to a right region of the current block.

2. The video decoding method of claim 1, wherein generating the intra prediction block for the current block comprises:
generating first intra prediction blocks, based on first reference pixels adjacent to the reference block;
determining an intra prediction mode, based on distortions of the first intra prediction blocks and the reference block; and
generating the intra prediction block, based on the intra prediction mode and the reference pixels adjacent to the current block.

3. The video decoding method of claim 1,
wherein the weighted values are determined based on whether neighboring blocks adjacent to the current block are intra prediction-coded and inter prediction-coded.

4. The video decoding method of claim 1,
wherein the weighted values are determined based on at least one of an error distribution of intra prediction or an error distribution of inter prediction.

5. A video encoding method comprising:
generating an inter prediction block for a current block, based on a reference block that corresponds to the current block and exists in a reference picture;
generating an intra prediction block for the current block, based on reference pixels adjacent to the current block;
determining weighted values assigned to the inter prediction block and the intra prediction block based on a plurality of regions in the current block; and
generating a combined inter/intra prediction (CIIP) block of the current block, based on the weighted values, the inter prediction block, and the intra prediction block,
wherein the weighted values assigned to the intra prediction block have different values for each of the plurality of regions in the current block, and
wherein the weighted values assigned to the intra prediction block decrease from an upper region to a lower region of the current block or from a left region to a right region of the current block.

6. The video encoding method of claim 5, wherein generating the intra prediction block for the current block comprises:
generating first intra prediction blocks, based on first reference pixels adjacent to the reference block;
determining an intra prediction mode, based on distortions of the first intra prediction blocks and the reference block; and
generating the intra prediction block, based on the intra prediction mode and the reference pixels adjacent to the current block.

7. The video encoding method of claim 5,
wherein the weighted values are determined based on whether neighboring blocks adjacent to the current block are intra prediction-coded and inter prediction-coded.

8. The video encoding method of claim 5, further comprising:
encoding index information to which the weighted values are mapped.

9. A method for providing a video decoding apparatus with video data, the method comprising:
encoding the video data into a bitstream; and
transmitting the bitstream to the video decoding apparatus,
wherein encoding the video data comprises:
generating an inter prediction block for a current block, based on a reference block that corresponds to the current block and exists in a reference picture;
generating an intra prediction block for the current block, based on reference pixels adjacent to the current block;
determining weighted values assigned to the inter prediction block and the intra prediction block based on a plurality of regions in the current block; and
generating a combined inter/intra prediction (CIIP) block of the current block, based on the weighted values, the inter prediction block, and the intra prediction block,
wherein the weighted values assigned to the intra prediction block have different values for each of the plurality of regions in the current block, and
wherein the weighted values assigned to the intra prediction block decrease from an upper region to a lower region of the current block or from a left region to a right region of the current block.

* * * * *